United States Patent [19]
Dereng

[11] 3,931,734
[45] Jan. 13, 1976

[54] PARACHUTE CANOPY TESTING APPARATUS

[76] Inventor: Viggo G. Dereng, 702 Juniper Drive, Newport News, Va. 23601

[22] Filed: Feb. 6, 1974

[21] Appl. No.: 440,004

[52] U.S. Cl. .................................................. 73/147
[51] Int. Cl.² ........................................ G01M 9/00
[58] Field of Search ............ 73/147, 432 SD, 432 R; 116/114 N

[56] References Cited
UNITED STATES PATENTS
1,676,984  7/1928  Fales et al. ............................ 73/147
2,616,291  11/1952  Benedum ............................. 73/147

OTHER PUBLICATIONS
Journal of Aircraft, Vol, 7, No. 4, July–Aug. 1970, TL 501 J63, pp. 341–347, Heinrich et al.

Primary Examiner—Richard C. Queisser
Assistant Examiner—Marcus S. Rasco
Attorney, Agent, or Firm—Larson, Taylor and Hinds

[57] ABSTRACT

A parachute canopy testing apparatus for aiding in the investigation of the dynamic behavior of parachute canopies includes a pair of splitter plates arranged parallel to an air flow created within a test housing in a preferred embodiment and at least one gore of a parachute canopy positioned between the plates in sealing relationship to the side walls thereof. The plates preferably form two V-shaped passages and opposed gores are respectively located in the passages. One of the plates preferably includes an array of apertures therein through which smoke is released to provide visual indication of the air flow patterns.

9 Claims, 8 Drawing Figures

U.S. Patent  Jan. 13, 1976  Sheet 1 of 2  3,931,734
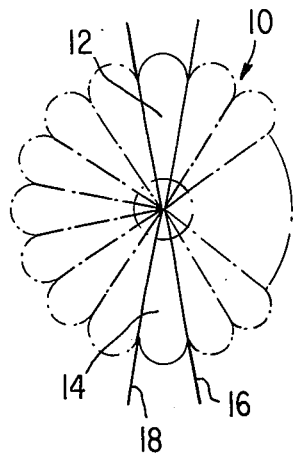
FIG. 1
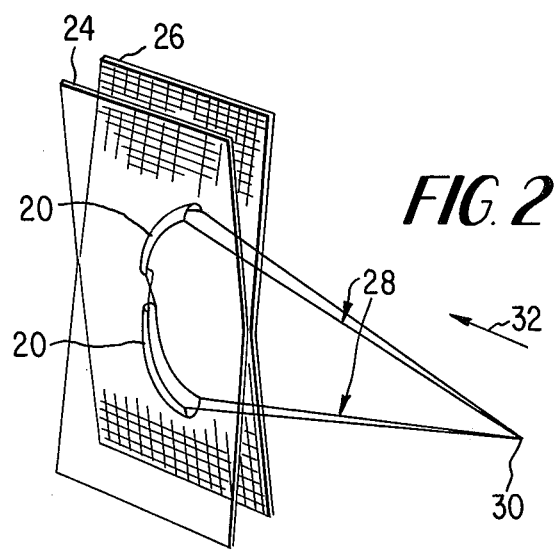
FIG. 2
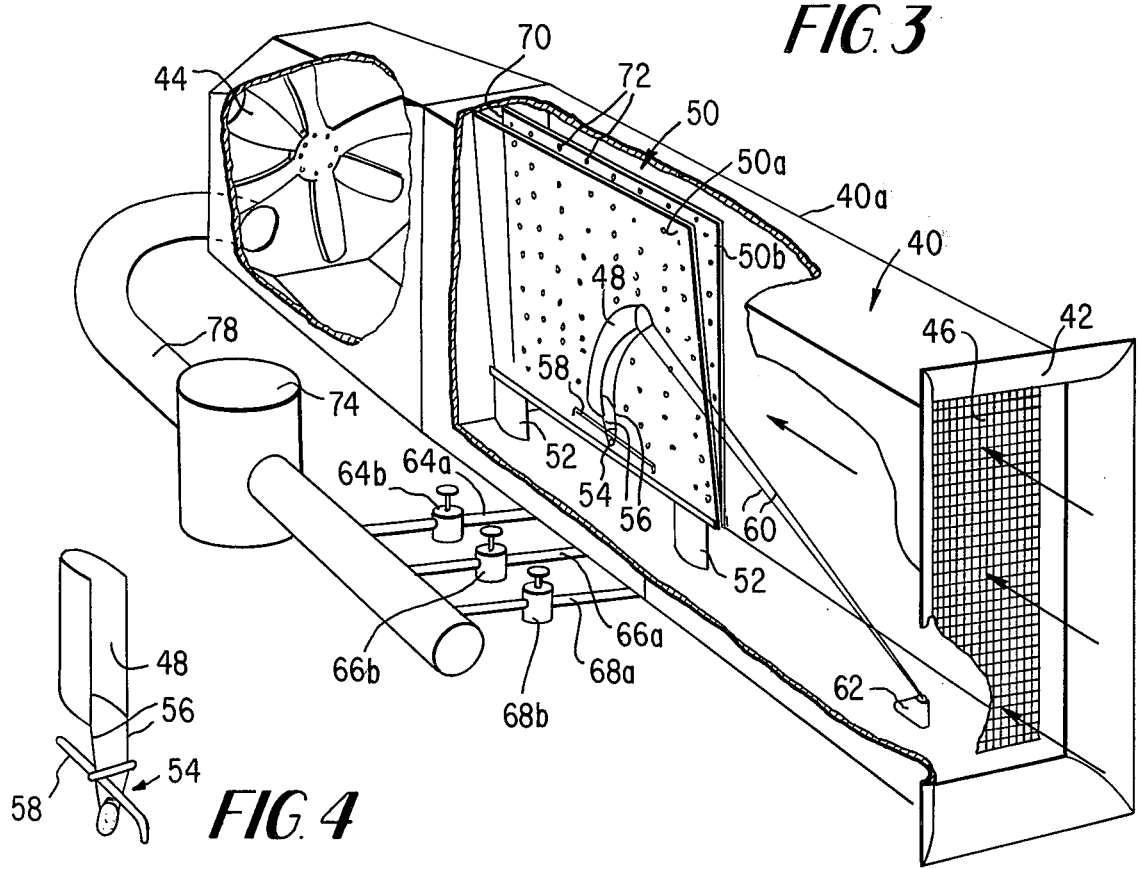
FIG. 3
FIG. 4

PARACHUTE CANOPY TESTING APPARATUS

FIELD OF THE INVENTION

The present invention relates to parachute testing and more particularly to a parachute canopy testing apparatus for investigating the dynamic behavior of parachute canopies under various conditions.

BACKGROUND OF THE INVENTION

Although substantial advances have been done in parachute technology over the past three decades, parachute design is still largely based on a combination of analysis and empirical observation. This is particularly true of work done in an attempt to analyze the time-varying behavior of a parachute during inflation or partial collapse. The lack of any suitable testing apparatus for determining the internal and external flow fields associated with filling and collapse would appear to be a major reason for the lack of comprehensive studies in this area.

Prior art parachute testing devices and systems include wind tunnel testing of parachute canopies and the use of water flow table models to simulate the flows thought to be involved. The former technique suffers a number of disadvantages including confusion of the airstream lines due to the three dimensional flow propagation of the smoke particles used in determining the flow fields, the "blanking" of internal flow by the "near side" (observer's side) of the canopy cloth, and the inability of the flow velocity and pressure sensing devices to occupy the volume of space through which the canopy must extend. In fact, water table models were used because of the many problems associated with wind tunnel testing of actual or scale model canopies. However, such models simply do not provide accurate simulation of the phenomena in question. In particular, the liquid velocities and mass relationships in such testing arrangements are so unlike those actually encountered with actual parachute canopies that new problems were created regarding relating mass, velocity, viscosity, and scale relationships to actual conditions.

SUMMARY OF THE INVENTION

In accordance with the invention, a parachute canopy test apparatus for simulating parachute canopy flight shapes and flow patterns is provided which includes at least parachute sector or gore segment and pair of splitter plates between which the at least one parachute gore is located such that the edges of the gore act as seal against the sidewalls of the plates. With the suspension lines of the gore fixed at a suitable location at the forward end of a test tunnel and an air flow directed generally parallel to the longitudinal axes of the splitter plates the gore shapes produced compare well with those observed during free flight of a parachute. The testing apparatus is particularly suitable for investigating phenomena associated with dynamic expansion of a parachute canopy, as well as post expansion phenomena, and can be utilized to provide realistic flow pattern, velocity and pressure information. Further, the apparatus enables the dynamic action of parachute flow fields to be observed and recorded under both variable and steady state conditions.

Although single gores can be used, it is preferred to use opposed gores located between a pair of splitter plates each in the shape of a shallow V and located with their vertices adjacent one another, so that the first gore is located between the sidewalls of the upper halves of the plates and the second gore is located between the sidewalls of the lower halves of the plates. Other splitter plate shapes can be used and, in particular, the combinations of one V-plate and one flat plate, and two flat plates, both have advantages.

In accordance with a further important feature of the invention, a "smoke" generator arrangement is provided for simulating the air flow lines around the canopy so that the flow pattern or field can be investigated. The smoke generator includes a perforate plate which is positioned adjacent the canopy gore and which has an array of apertures therein through which a smoke is released. The perforate plate is preferably formed by one of the splitter plates and under normal conditions issues a plurality of smoke "pencils" which simulate air flow lines and are displaced by the canopy during filling thereof.

Other features and advantages of the invention will be set forth in, or apparent from, the detailed description of preferred embodiments found hereinbelow.

BRIEF DESCRIPTION OF THE DRAWINGS

FIG. 1 is a highly schematic plan view of a parachute canopy used for illustrative purposes;

FIG. 2 is a perspective view of a simplified form of one embodiment of the test assembly of the invention;

FIG. 3 is a perspective view of a practical testing apparatus incorporating the invention, illustrating a further embodiment of the test assembly;

FIG. 4 is a perspective view of a detail of the apparatus of FIG. 3;

DESCRIPTION OF THE PREFERRED EMBODIMENTS

Figure 5:
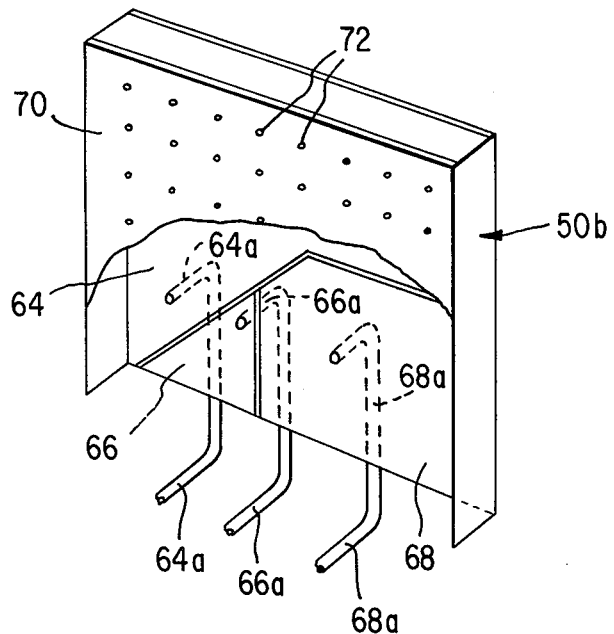
FIG. 5 is a perspective view of a further detail of the apparatus of FIG. 3.

Referring to FIG. 1, a highly schematic plan view of a parachute canopy, generally denoted 10, is shown in dashed lines, opposed parachute sectors or gores 12 and 14 being shown in solid lines between solid V-shaped lines 16 and 18. According to the embodiment of the invention as shown in FIG. 2, opposed gores 20 and 22, corresponding to gores 12 and 14 of FIG. 1, are located between V-shaped splitter plates 24 and 26 which, in cross section, correspond to lines 16 and 18 of FIG. 1. As discussed hereinabove, it has been found that with parachute gores 20 and 22 located between splitter plates 24 and 26 so that side edges of the former are in sealing relationship with sidewalls of the latter as illustrated and with the suspension lines 28 fixed at a suitable point 30, as indicated, an air flow directed thereon such as indicated at 32 in FIG. 2 cause the gores 20, 22 to accurately simulate phenomena associated with the dynamic expansion of, or post expansion steady state conditions of, a complete parachute canopy.

Referring to FIG. 3, a practical embodiment of a testing apparatus incorporating the invention is shown. While the apparatus of FIG. 3 is adapted to test a single gore, the apparatus can also be used to test opposed gores such as shown in FIG. 2. The apparatus includes a wind tunnel 40 including a test section 40a of generally rectangular shape and a flared entrance portion 42 into which air is drawn by a fan 44 located at the aft end of the tunnel 40. In an exemplary embodiment, the fan 44 is V-belt driven in incremental steps up to 3000 rpm. and is capable of delivery flow velocities up to 40 feet per second, although present limitations on photographic equipment place the practical upper limit on test velocities in the neighborhood of 30 feet per second. A flow screen 46 located in the entrance opening serves to smooth the entering air flow. In the exemplary embodiment referred to, the screen 46 is of a ½-inch square, one-inch deep honeycomb construction.

The parachute canopy gore to be tested is denoted 48 and is mounted between the sidewalls of a V-shaped splitter assembly generally denoted 50. Assembly 50 is supported within the test section 40a of tunnel 40 on supports 52. A miniature ball bearing trolley, indicated at 54 and shown in more detail in FIG. 4, which is connected to gore 38 through gore vent lines 56 and which rides along an I-beam monorail 58 (a portion of which is also shown in FIG. 4) located at the apex of the V assembly 50, provides axial freedom of movement of the inboard end of the gore 48. In this regard, it might be noted here that one advantage of the double or opposed gore arrangement of FIG. 2 is that the trolley and monorail arrangement described above can be dispensed. Gore 48 is connected by suspension lines 60 to a mount 62 which fixes the lines 60 at a suitable forward location in tunnel test section 40a.

The front panel 50a of V-assembly 50 is constructed of glass while the back panel 50b is of a hollow construction described in more detail in connection with FIG. 5. The angle of the V formed by panels 50a and 50b can be adjusted, this adjustment being provided to enable a separation angle to be determined which ensures that the gore 48 acts as a seal against the sidewalls of the panels 50a, 50b. In tests conducted using the specific embodiment described and a 54-inch diameter gore model, a V angle of 7.5° stabilized the gore with a minimum of pressure contact. Extensions (not shown) of the V-assembly can be provided both fore and aft to respectively provide more realistic flow patterns ahead of the gore and to reduce the interference between the bypass air and the parachute gore wake. Boundary-layer effects can be minimized by bleed slots (not shown) in both panels of the V-assembly 50 at the rear of the forward extensions referred to above.

Referring to FIG. 5, the back panel 50b of the V-assembly 50 is shown in more detail. The panel 50b is, as stated above, of the hollow construction with the hollow interior divided into three manifold sections 64, 66 and 68. The largest of these, manifold section 64, covers the area which is generally exterior to the profile of the gore 48 while the two smaller manifold sections 66 and 68 are intended to provide coverage of the flow interior to the gore profile during the transient stages of gore inflation. In accordance with an important feature thereof, the front wall 70 of panel 50b includes an array of apertures or orifices 72 therein so that each manifold section has an associated array or grid of orifices. Each of the manifold sections 64, 66 and 68 is connected to a corresponding smoke inlet line 64a, 66a and 68a. The smoke issues from the manifold sections through the orifices 70 in panel 50b to form a plurality of pencil-like flow lines which can be used to investigate the behavior of the flow pattern under various conditions.

The flow lines so produced have decided advantages as compared with prior systems and, in particular, the flow line generator system of the invention permits the use of flow rates substantially higher than those that can be used in prior art systems.

Referring again to FIG. 4, the flow line generator system of the invention further comprises a smoke generator 74 which feeds lines 64a, 66a and 68a though a common line 76. Corresponding control valves 64b, 66b and 68b are included in lines 64a, 66a and 68a. Smoke generator 74 is a ram air pressurized generator of conventional construction, with the ram air being supplied from fan 44 through line 78 in the embodiment illustrated. In the specific embodiment under discussion, titanium tetrachloride smoke is used although the high acid content thereof is of concern. It will be understood that other "smokes" can be used as well as air mixed particles such as chalk, dust, talcum, microballoons and the like, and hence the term "smoke" as used herein is not limited to suspensions normally regarded as smokes. Further, it is noted that the smoke generator system described is not limited to the particular gore test apparatus discussed above and may be used with apparatus using a single back plate against which semi-span models and airfoils can be viewed.

The operation of the apparatus of FIGS. 3 to 5 should be evident from the foregoing. Air drawn into test section 40a by fan 44 will inflate canopy gore 48 and with smoke generator 74 actuated the smoke released through orifices 72 in the back wall 50b of splitter assembly 50 will provide a two-dimensional indication of the air flow patterns associated with gore 48 during various stages. The wall of test section 40 adjacent plate 50a can also be made of glass or clear plastic so as to be transparent, hence enabling direct observation. Preferably, a photographic camera (or cameras) is used for observation and a sleeve (not shown) which initially fits over the gore is employed to restrain the test gore from premature inflation during the beginning stages of operation. The sleeve can be released automatically or manually and abrupt changes in flow velocity can be produced using "bat wing" screen doors (not shown) located in front of entrance portion 42 of tunnel 40. With suitable instrumentation other phenomena such as flow velocity and direction, pressures and the like, may be sampled and recorded. Further, modification may be made to accept Schleren optical systems. It should be noted that the testing apparatus of the invention is not limited to an adapter assembly within a conventional tunnel shape and ideally the tunnel cross section would take the shape of the adapter assembly to provide maximum efficiency and realistic flow distribution. Further, the orientation of the tunnel and air flow direction is not limited to horizontal but may be vertical (with an up and down flow) or at angle.

Figure 6:
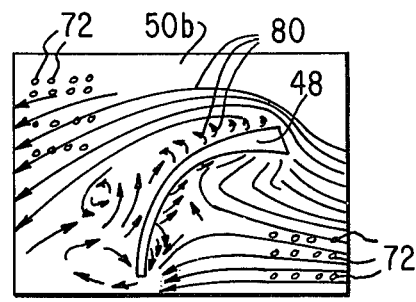
FIG. 6 is a highly schematic side view of the detail shown in FIG. 5 illustrating the flow patterns produced.

Referring to FIG. 6, the flow lines 80 associated with the canopy gore 48 just at full inflation are shown, illustrating the vortex activity within the affected air mass. The showing in FIG. 6 is, of course, an idealized one but the "smoke" issuing through apertures 72 does provide a realistic approximation of the actual flow pattern.

Figure 7:
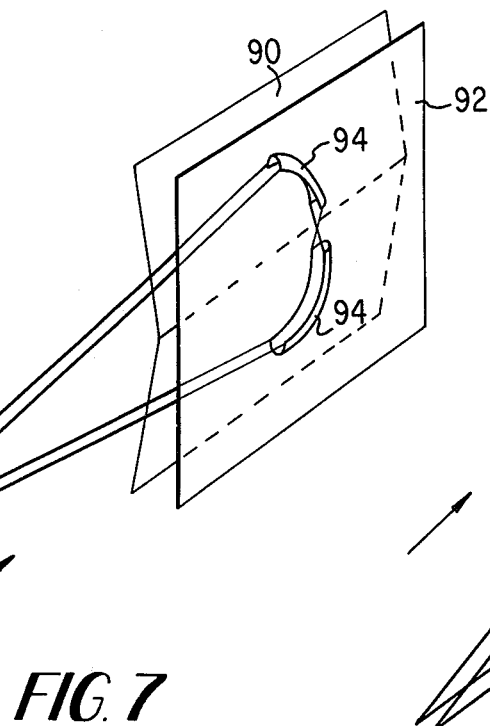
FIGS. 7 and 8 are perspective views similar to FIG. 2 illustrating two further embodiments of the test assembly of the invention.
Figure 8:
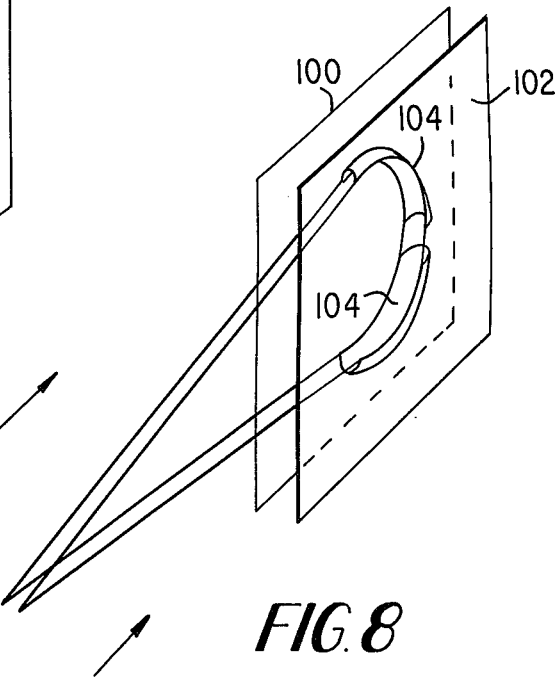

Referring to FIGS. 7 and 8, two further embodiments of the splitter plate assemblies of FIGS. 2 and 3 is shown. In the embodiment of FIG. 7 a flat plate 90 and a V-shaped plate 92 are employed with two opposed gores 94 located therebetween. In the embodiment of FIG. 8, twwo flat plates 100 and 102 are employed and a flat sided two opposed rectangular gores 104 is located therebetween. The latter embodiment is of particular advantage in studying cross flow phenomena.

Although the invention has been described relative to exemplary embodiments thereof it will be appreciated that variations and modifications may be effected in these embodiments without departing from the scope and spirit of the invention.

I claim:

1. A parachute canopy testing apparatus for investigating the dynamic behavior of parachute canopies comprising at least one parachute gore, means for directing a fluid flow past said gore, means comprising first and second spaced splitter plates, positioned parallel to said flow and between which said flow passes, for receiving said gore therebetween, and means for suspending said gore between said plates so that said gore can be filled by said fluid flow, the spacing between said plates being such that the edges of said gore form a seal with the sidewalls of the plates.

2. A testing apparatus as claimed in claim 1 wherein said plates each are of a shallow V-shape with the vertices of the plates lying adjacent one another so as to form first and second V-shaped passageways, first and second gores being respectively received in said passageways.

3. A testing apparatus as claimed in claim 1 wherein one of said plates comprises a shallow V-shaped plate and the other of said plates comprises a flat plate, said plates being positioned adjacent each other to form two flow passages and first and second gores being respectively located in said passages.

4. A testing apparatus as claimed in claim 1 wherein said splitter plates each comprise a flat plate and a pair of rectangular gores are received between said plates.

5. A testing apparatus as claimed in claim 1 further comprising means for generating lines of smoke in the area of said gore so that the fluid flow pattern in the area of said gore can be determined, said smoke generating means including a perforate plate having an array of apertures therein through which said smoke issues.

6. A testing apparatus as claimed in claim 5 wherein said perforate plate is formed by one of said splitter plates.

7. A testing apparatus as claimed in claim 6 wherein said smoke generating means includes a chamber located behind said perforate plate, means for dividing said chamber into a plurality of compartments so that each compartment is associated with a corresponding section of the array of apertures, connecting lines for connecting said compartments to said smoke source, and control means located in each of said connecting lines for controlling the smoke input to the corresponding compartment.

8. A testing apparatus as claimed in claim 5 further comprising a housing in which said splitter plates are located, said suspending means includes suspension lines affixed to said housing at a position forward of said at least one gore, and said flow directing means comprises a fan located in said housing at a position aft of said at least one gore.

9. A testing apparatus as claimed in claim 8 wherein said smoke generating means includes a air ram operated smoke generator which receives ram air from said fan.

* * * * *